Feb. 26, 1952 J. V. L. HOGAN 2,587,319
QUANTITY RECORDER
Filed April 12, 1945 2 SHEETS—SHEET 1

INVENTOR
John V. L. Hogan
BY
Alfred W. Barber
ATTORNEY

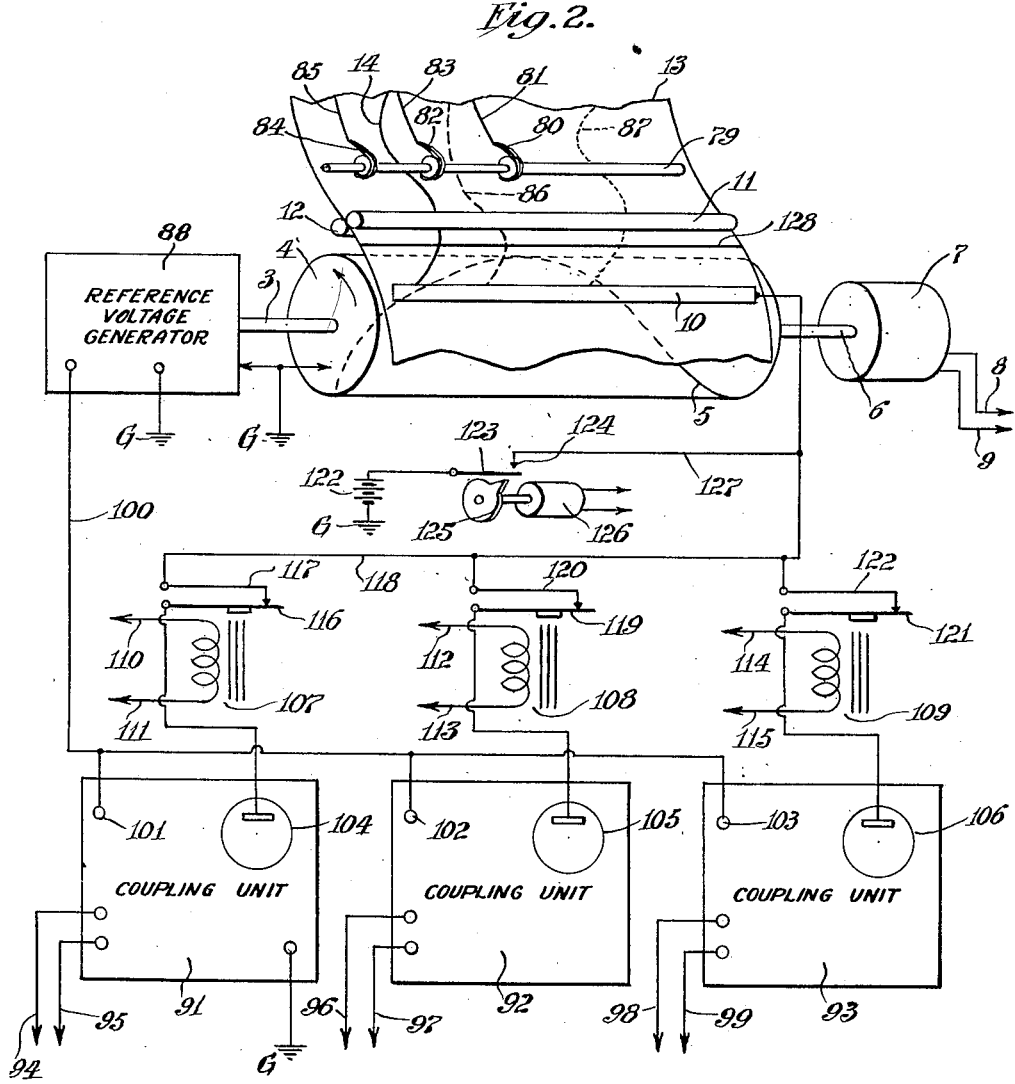

Patented Feb. 26, 1952

2,587,319

UNITED STATES PATENT OFFICE 2,587,319

QUANTITY RECORDER

John V. L. Hogan, Forest Hills, N. Y., assignor to Faximile, Inc., New York, N. Y., a corporation of Delaware Application April 12, 1945, Serial No. 588,037

3 Claims. (Cl. 346—33)

The present invention concerns recorders and in particular continuous sheet recording of a varying electrical quantity.

One object of the present invention is to provide a method of and means for recording a wide range of quantities of varying magnitude such as an electrical voltage or current, quantites which may be transformed into electrical quantities and quantities such as pressure and velocity which may be recorded more or less directly on a continuous strip of paper so as to provide a record covering any desired period of time.

Another object is to provide a quantity recorder which is simple, efficient and accurate.

A still further object is to provide a method of and means for employing a helical electrode and continuous sheet for recording varying quantities against a time base.

These and further objects of the invention will be evident from the detailed description of the invention.

In the art of facsimile the recordings of text and pictures is often accomplished by means of a recorder comprising a fixed linear electrode and a cooperating helical electrode. The helical electrode is rotated, causing its point of intersection with the linear electrode to trace successive lines across a recording sheet. The recording sheet is drawn between the two electrodes. One of the advantages of this type of recorder is that the recording sheet may be continuous. The recording sheet is impregnated with an electrically colorable solution and recording is accomplished electrolytically by passing a modulated current between the electrodes through the recording sheet.

The present invention concerns a method of and means for recording one or more electrical quantities on a continuous sheet by means of a helical recorder. Any electrical phenomenon which produces directly or indirectly a related current or voltage may be recorded in this way. The sheet may be advanced at a constant and predetermined rate to provide a time base while the transverse position of the recording mark indicates the magnitude of the electrical quantity being recorded. The present invention includes methods of and means for transforming an electrical current or voltage into a timed impulse. The instant at which the impulse is produced must correspond with the desired recording point indicating electrical magnitude, as determined by the intersection of the helical and linear electrodes of the recorder.

In one embodiment of the invention, a sawtooth voltage is produced, timed to correspond with the rotation of the recording helix and synchronized to start each serration at the start of each rotation. A voltage to be recorded is compared with the saw-tooth voltage and when they are equal, a recording impulse is created. Since the voltage equality corresponds with a particular time in the saw-tooth voltage, the voltage is transformed into a timed impulse. The time of the impulse corresponds with the desired recording point in the rotation cycle of the helical recorder.

In the drawings:

Fig. 2 shows a modification wherein several quantities may be recorded simultaneously and reference lines are provided.

Figure 1:
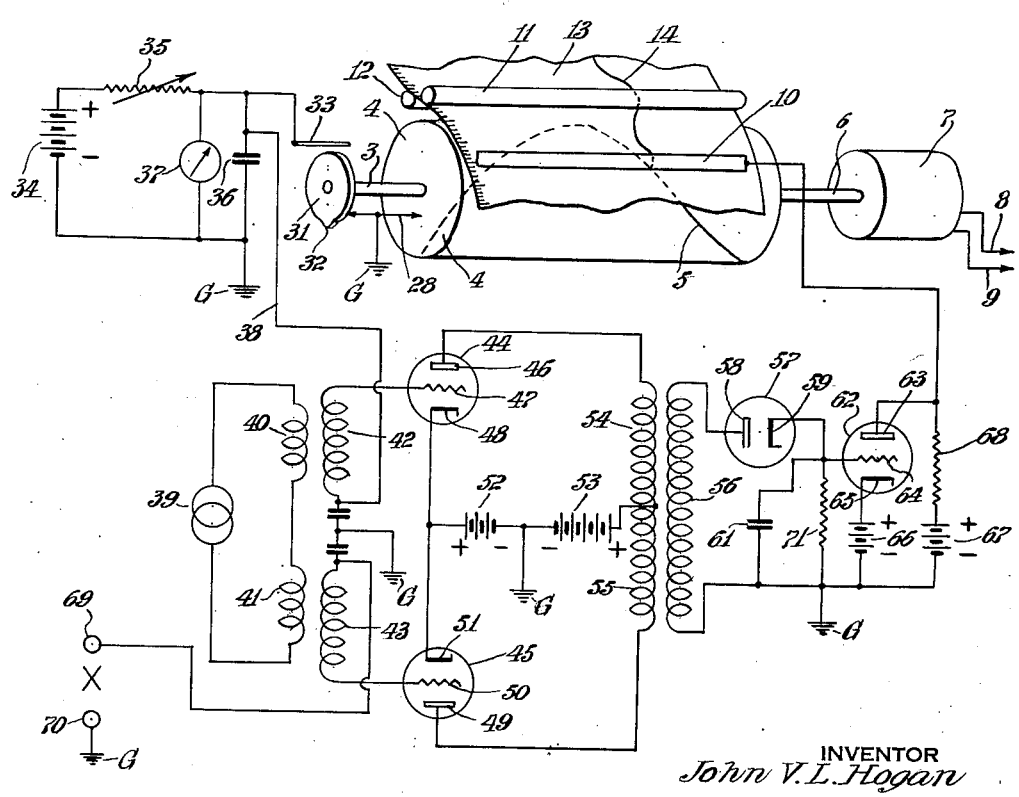
Fig. 1 shows one embodiment of the present invention.

Fig. 1 shows a helical recorder including drum 4 carrying recording helix 5, cooperating linear electrode 10 and driving motor 7. Motor 7 drives drum 4 through shaft 6 which may include suitable speed reducing gears not shown. Power is supplied from a suitable source over wires 8 and 9. Recording is carried out on sheet 13 advanced between rollers 11 and 12.

A saw-tooth voltage is generated, synchronized with drum 4 and phased to start at the instant one end of the helix 5 starts to pass under linear electrode 10. This saw-tooth voltage is generated by charging condenser 36 through resistor 35 from voltage source 34 and periodically shorting condenser 36 through contactor 32—33. Contactor 32—33 is closed periodically in synchronism with the rotation of drum 4 through shaft 3. This contactor 32—33 is phased to close at the end of the passage of the other end of the helix 5 under linear electrode 10 to end the saw-tooth pulse and to open at the start of the next passage of helix 5 under linear electrode 10 to start a new saw-tooth pulse by the proper location of contact head 31 on shaft 3. Peak voltage reading meter 37 is provided to indicate the amplitude of the saw-tooth voltage and hence the ordinate of the recording on sheet 13. Resistor 35 is made variable so that this ordinate of the recording may be set to a desired value.

The voltage to be recorded is compared with this saw-tooth voltage in a balanced modulator, including vacuum tubes 44 and 45. Alternating current from source 39 is applied equally to grids 47 and 50 by means of coils 40—41—42 and 43. Cathodes 48 and 51 receive a suitable bias from voltage source 52. Plates 46 and 49 feed equal coils 54 and 55 and are supplied with steady current from source 53. Coils 54 and 55 are coupled to coil 56, so that when grids 47 and 50 have the same bias, the two coils 54 and 55 induce equal and opposite voltages in coil 56. The saw-tooth voltage across condenser 36 is applied as a bias to grid 47 by means of lead 38 and through coil 42, while the voltage X which is to be recorded is connected across points 69 and 70 and hence to grid 50 through coil 43. As has been shown above, when the saw-tooth voltage equals the voltage to be recorded, no alternating current appears across coil 56. Rectifier 57 and amplifier 62 operate to produce a mark on sheet 13 whenever no voltage exists across coil 56 and hence whenever the voltage to be recorded matches the saw-tooth voltage. Rectifier 57 includes plate 58 and cathode 59. One end of the coil 56 is connected to plate 58 and the other end is connected through load resistor 71 bypassed by condenser 61 to cathode 59. Thus, when alternating current flows in coil 56 the cathode end of resistor 71 is made positive by rectification in tube 57. Amplifier 62 includes cathode 65, control grid 64 and plate 63. Plate 63 is supplied with current from source 67 and is loaded by series resistor 68. Cathode 65 is connected to bias source 66 which is of such value that when no rectified current bias is fed to grid 64 from tube 57 the plate current drop in 68 leaves a sufficient voltage at plate 63 to record when applied to electrode 10. For all unbalanced conditions, alternating current flows in coil 56, producing a rectified current bias on grid 64 which is positive and which increases the plate current through resistor 68, dropping the potential of plate 63 and hence electrode 10 below the point at which a mark is made on sheet 13. Thus marks are produced on sheet 13 each time the saw-tooth wave reaches a point equal to the voltage to be recorded. The time at which this takes place bears the same ratio to the total rotation time of the helix 5 as the voltage to be recorded bears to the amplitude of the saw-tooth voltage. Hence the amplitude of the voltage to be recorded is transformed into a timed pulse which is recorded at a point on sheet 13 which indicates its amplitude in terms of distance across the sheet.

Fig. 2 shows a modification of the invention wherein several electrical quantities or quantities which may be transformed into electrical quantities for recording purposes are recorded on a single record sheet. In addition reference lines are also provided on the sheet. As in Fig. 1, helix 5 carried by drum 4 is rotated by motor 7. Box 88 may be taken to represent any suitable reference voltage generator such as the sawtooth voltage generator of Fig. 1. The reference voltage from generator 88 is distributed to several incoming voltage coupling units such as units 91, 92 and 93 by means of lead 100 connected to points 101, 102 and 103 respectively. Each of coupling units 91, 92 and 93 and their associated equipment is capable of producing an independent and distinctive record on recording sheet 13.

Coupling unit 91 receives an input voltage to be recorded over leads 94 and 95. Within coupling unit 91 the input voltage to be recorded is compared to the reference voltage from 88 providing in the output of tube 104 impulses to be recorded and representing the magnitude of the input voltage. In order to make the mark from unit 91 distinctive it is passed through contacts 116 and 117 controlled by relay 107. Relay 107 is energized over leads 110 and 111 from a suitable source of voltage, not shown. In the example as shown unit 91 provides a continuous mark 14 produced by allowing contacts 116—117 to remain closed.

Coupling unit 92 similarly provides marking impulses representing a voltage to be recorded which is applied to leads 96 and 97. The recording signal from output tube 105 passes through the contacts 119 and 120 of relay 108. Relay 108 is energized from a suitable voltage source, not shown, over leads 112 and 113 to open contacts 119—120 for short intervals at spaced intervals thus interrupting the recorded mark and providing the distinctive dash line recording 86.

Similarly coupling unit 93 provides marking signals interrupted at still shorter intervals by relay 109 and providing the dotted line recording 87.

Suitable interrupted currents for producing the dash or dot line effects may be supplied by any means well known in the art, not shown, such as a battery in series with a motor driven commutator contactor wherein the length of the dashes or dots is determined by the motor speed and the length of the commutator segments.

Thus three independent and distinctive records of three separate quantities are provided on a single continuous record sheet.

Various reference quantities may also be recorded on the sheet as, for instance, lines indicating reference voltages, percentages or other quantities and time lines. Adjustable stylus bar 79 carries the adjustable styli 80, 82 and 84. These styli may be energized from a battery source but, for simplicity, are shown as inking styli. Styli 80, 82 and 84 make continuous parallel recording lines 81, 83 and 85 respectively, on recording sheet 13. By adjusting the relative positions of styli 80, 82 and 84 along bar 79 these parallel lines may be positioned to represent any desired reference quantities such as 25 percent, 50 percent and 100 percent of the quantities being recorded, reference voltages or other reference quantities.

Time lines may be drawn across the sheet by energizing linear electrode 10 for a time at equal to the period of revolution of helix 5 at predetermined time intervals as for instance by means of cam 125 driven by synchronous motor 126 closing contacts 123 and 124 applying voltage from battery 122 over lead 127 to helix 5.

While a few variations of the present invention have been shown and described many variations and combinations will be evident to those skilled in the art and within the spirit and scope of the invention as set forth in the appended claims.

What is claimed is:

1. A recording system for recording a varying electrical quantity including the combination of, a cyclic recorder for marking at a point on a record sheet determined by the timing of a recording impulse, a saw-tooth voltage generator, means for synchronizing said saw-tooth voltage with the recorder, means for comparing a voltage to be recorded with said saw-tooth voltage, and means for generating said recording impulse at the instant when the saw-tooth voltage equals the voltage to be recorded.

2. A recording system for recording a varying electrical quantity including the combination of, a cyclic recorder for marking at a point on a record sheet determined by the timing of a recording impulse, a saw-tooth voltage generator including a capacitor which is alternately charged and discharged, means for synchronizing said saw-tooth voltage with the recorder, means for comparing a voltage to be recorded with said saw-tooth voltage, and means for generating said recording impulse at the instant when the saw-tooth voltage equals the voltage to be recorded.

3. In a device for recording a varying electrical voltage on an electro-responsive sheet, the combination of: a rotating helical recording electrode and a cooperating linear recording electrode, a saw-tooth voltage generator synchronized with said helical electrode, electronic circuit means receptive to both the voltage to be recorded and the saw-tooth voltage and operative to generate a pulse when the instantaneous voltages are in a fixed predetermined ratio, and means for applying said pulse to the recording electrodes.

JOHN V. L. HOGAN.

REFERENCES CITED

The following references are of record in the file of this patent:

UNITED STATES PATENTS

| Number | Name | Date |
|---|---|---|
| 620,326 | Jaeger | Feb. 28, 1899 |
| 620,327 | Jaeger | Feb. 28, 1899 |
| 1,562,273 | Amsler | Nov. 17, 1925 |
| 1,597,828 | Roucka | Aug. 31, 1926 |
| 1,641,199 | Roucka | Sept. 6, 1927 |
| 1,825,551 | Serrell | Sept. 29, 1931 |
| 2,125,345 | Hunt | Aug. 2, 1938 |
| 2,132,808 | Sigo | Oct. 11, 1938 |
| 2,135,028 | Bokovay et al. | Nov. 1, 1938 |
| 2,213,876 | Young | Sept. 3, 1940 |
| 2,228,883 | Morgan | Jan. 18, 1941 |
| 2,387,760 | Keinath | Oct. 30, 1945 |
| 2,425,080 | Blakeslee | Aug. 5, 1947 |
| 2,477,062 | Jacobi | July 26, 1949 |